June 3, 1941.    F. E. HUBBARD ET AL    2,244,158
WATER TREATING COMPOSITION
Filed Nov. 4, 1938

F. E. HUBBARD
AND    Inventors
C. R. MCCULLOUGH

Herbert Chase.
Attorney

Patented June 3, 1941

2,244,158

UNITED STATES PATENT OFFICE 2,244,158

WATER TREATING COMPOSITION

Findley E. Hubbard and Campbell R. McCullough, Anniston, Ala., assignors to Monsanto Chemical Company, a corporation of Delaware Application November 4, 1938, Serial No. 238,926

6 Claims. (Cl. 252—175)

This invention relates to aggregated or agglomerated phosphate products and particularly to such products having a high solubility rate.

One object of the present invention is to provide an aggregated metal polyphosphate in a form possessing a rapid rate of reaction. A further object is the provision of a phosphate product in convenient form for water treating purposes. A still further object is to provide a nonsegregable dehydrated phosphate product in form suitable for reaction with water to produce solutions thereof.

One of the difficulties attending the solution in water of the alkali metal meta or polyphosphates is the tendency of such phosphates, when added to water to become sticky and gummy and therefore to have a relatively low rate of solution in water. When this occurs dissolving becomes extremely slow and difficult even though stirring is resorted to. In this connection it has already been proposed to press molten metaphosphates into thin flakes which were then subsequently coated with alkali metal salts. Such flaked product displays an improved solubility rate over that of the original material but in most cases the rate is still so slow as to be objectionable for many applications.

We have now found that the alkali metal metaphosphates or polyphosphates if first reduced to powder form can be aggregated by means of moisture into small irregular granules or aggregates, which when added to water quickly fall apart and dissolve rapidly. The effect of our treatment is to provide a granular phosphate for convenience in handling, etc., while at the same time retaining the rapid solubility of the individual particle of which the granule is composed.

We prefer to effect aggregation of the powdered alkali metal meta or polyphosphates by developing upon the surface of the powder particles a film of sticky material. Such sticky material is preferably obtained upon the surface of the powder particles by exposing the same to water or water vapor, or by coating the particles with some sticky material. After the particles of the powder have been so treated they are agitated by revolving in a drum or stirred in a suitable manner. This treatment causes the particles of powder to agglomerate into larger granules which may then be made to have a considerable size. Before, during or prior to the process of aggregation described we may add other powdered salts to the powdered alkali metal metaphosphate or polyphosphates. By combining several salts in this manner with the meta phosphate, a variety of products suitable for various uses may be produced.

In spite of the size of the granules produced by the herein described process, the rate of solubility is apparently greater than that of the original powder of which the granules are produced. This is so because of the shape of the original particles and the method of attachment of the particles to each other.

Figure 1:
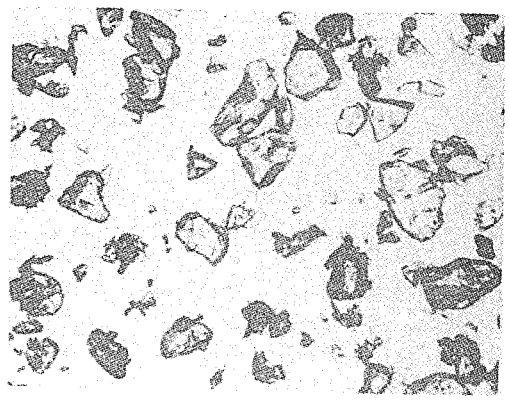
Figure 1 shows a reproduction of a microphotograph of the original particles, enlarged 80 times, of the so-called sodium hexametaphosphate before having been aggregated as herein described. The material here represented had been screened to pass 80 mesh screen.
Figure 2:
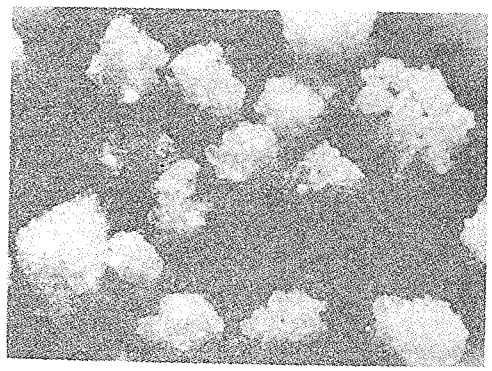
Figure 2 shows a microphotograph, enlarged 20 times of the aggregated granules of our product. This material has been screened to pass a 16 mesh screen and remain on a 50 mesh screen.

The individual agglomerated granule here shown in Figure 2 on the average contains between 100 and 1500 of the discrete particles shown in Figure 1. These limits may be altered by a change in size of the granule or by change in size of the particle to the extent that each granule will contain from 25 to as many as 3000 particles per granule. Each aggregate has a very irregular outer surface, as shown in Figure 2, and possess considerable porosity because of the irregularity of the individual particles composing the granule.

Because of the inherent porosity possessed by the polyphosphate granule the rate of solubility is enormously increased.

One of the difficulties attending the process of dissolving the alkali metal polyphosphates, especially those polyphosphates containing considerable quantities of equivalent metaphosphate is the fact that when the ordinary form of such polyphosphate is poured into water there is formed a very viscous solution immediately in contact with the surface of the polyphosphate with the result that diffusion through such film is very slow and the solution process is time consuming.

Our new product on the other hand, has the property of dissolving very rapidly when dropped into water. Granules such as we have shown in Figure 2 when dropped into water descend for approximately 4 to 8 inches and then disintegrate into the discrete individual particles due to the dissolving of the soluble bond between them and these particles then dissolve almost completely before descending an additional 4 to 8 inches. Thus it is possible to dissolve our product completely without the usual difficulties hitherto encountered.

The metaphosphates or polyphosphates referred to are the type that are readily soluble in water and have the ability of reacting or combining with calcium to soften water.

The polyphosphates may be thought of as products corresponding to the union of meta and pyrophosphates or their equivalent ortho salts, for example, for the sodium salts.

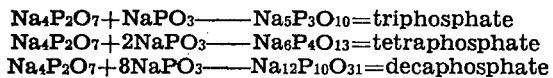

Various alkaline salts may be incorporated into the metaphosphate or polyphosphate compositions. Such salts serve as adjusting agents to change the alkalinity of the solutions obtained, which may accordingly be adjusted either to a higher or a lower level. We contemplate the addition of such compounds as caustic soda or sodium sulphate or sodium bisulfate, bisulphite, soda ash, sodium bicarbonate, sodium meta silicate, soaps, trisodium orthophosphates, sodium pyrophosphates or mixtures of these. The corresponding potassium salts may also be used if desired.

The following examples will serve to illustrate the various products which may be produced according to our invention.

Example I

Mix together 90 parts of dry —80 mesh sodium hexametaphosphate $(NaPO_3)_6$, 10 parts of a mixture containing equal weights of sodium carbonate and bicarbonate. Charge the mixture into a horizontal rotating drum and humidify with air saturated with water at 60° C. After a few minutes the material is discharged from the drum, screened and then may be dried. The product produced is free flowing and is rapidly soluble in water and will consist of irregularly shaped porous granules comprised of loosely adhering solid particles. Proportions may be varied as desired.

Example II

Mix together 85 parts of —80 mesh sodium tetraphosphate $Na_6P_4O_{13}$ and 15 parts of finely divided soap. Humidify and agglomerate as in Example I. The product will consist of irregularly shaped porous granules individually consisting of loosely adhering solid particles of sodium tetraphosphate interspersed with soap particles the whole being of exceptionally rapid solubility.

The proportions may be varied as desired.

Example III

Mix together 90 parts of dry —80 mesh sodium triphosphate, $Na_5P_3O_{10}$, and 10 parts of a mixture of equal parts by weight of sodium carbonate and bicarbonate. Humidify and agglomerate as in Example No. 1.

Example IV

Mix together 80 parts of dry —80 mesh sodium hexametaphosphate, 10 parts of tetrasodium pyrophosphate, $Na_4P_2O_7$, and 10 parts of a mixture containing equal parts by weight of sodium carbonate and bicarbonate. Humidify and agglomerate as in Example I.

Example V

Mix together 80 parts of dry —80 mesh sodium hexametaphosphate, 10 parts of crystalline disodium phosphate and 10 parts of sodium carbonate or bicarbonate. Agglomerate by the application of heat while rotating. Proportions may be varied as desired.

Having now particularly described our invention and the manner of working the same we desire not to be limited herein except as indicated by the prior art or as particularly pointed out by the following claims.

What we claim is:

1. A water treating product comprising distinct granules of sodium hexa meta phosphate, each granule being composed of a number of irregularly shaped particles of powdered sodium hexa meta phosphate, said granules having a solubility rate in excess of said powdered sodium hexa meta phosphate.

2. A water treating product comprising distinct granules of sodium hexa meta phosphate, each granule being composed of irregular powder particles of said hexa meta phosphate adhering to each other to form said granule, and having particles of a soluble salt interspersed in said granule, said granules having a solubility rate in excess of said powdered particles of sodium hexa meta phosphate.

3. A water treating product comprising distinct granules of sodium hexa meta phosphate, each granule being made up of irregularly shaped loosely adhering particles of powdered sodium hexa meta phosphate, said granules having such rapid solubility that upon dropping said granules into water, disintegration of said granules into the individual particles thereof takes place in a relatively short distance and complete solution of said particles takes place in a further short distance of descent.

4. The product defined in claim 2 in which the soluble salt is sodium carbonate.

5. A method of making a water treating product comprising reducing to powder form sodium hexametaphosphate, humidifying said powder in order to develop a sticky surface on said particles of powder, agitating said powder in the presence of particles of soluble salt to form agglomerates therewith and thereupon screening and drying said agglomerates.

6. The method of claim 5 in which the particles of soluble salt are sodium carbonate and sodium bicarbonate.

FINDLEY E. HUBBARD.
CAMPBELL R. McCULLOUGH.